Dec. 27, 1955     H. H. ALBINSON     2,728,333
ENGINE EXHAUSTING, SCAVENGING, AND CHARGING SYSTEM
Filed April 22, 1950     5 Sheets-Sheet 1

Inventor
Harold H. Albinson
By
Willits, Helwig & Baillio
Attorneys

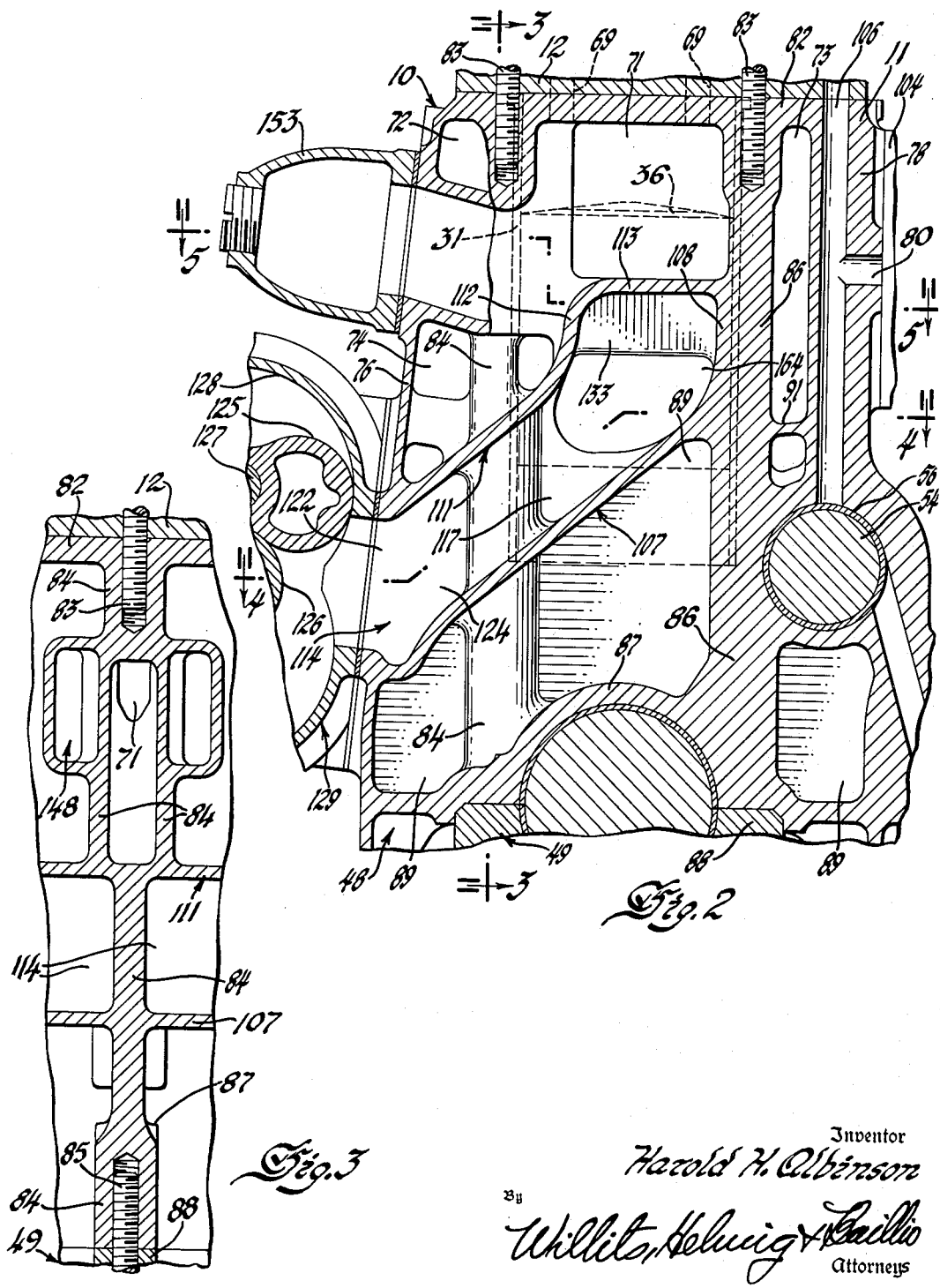

Dec. 27, 1955　　　　H. H. ALBINSON　　　　2,728,333
ENGINE EXHAUSTING, SCAVENGING, AND CHARGING SYSTEM
Filed April 22, 1950　　　　　　　　　　　　5 Sheets-Sheet 3
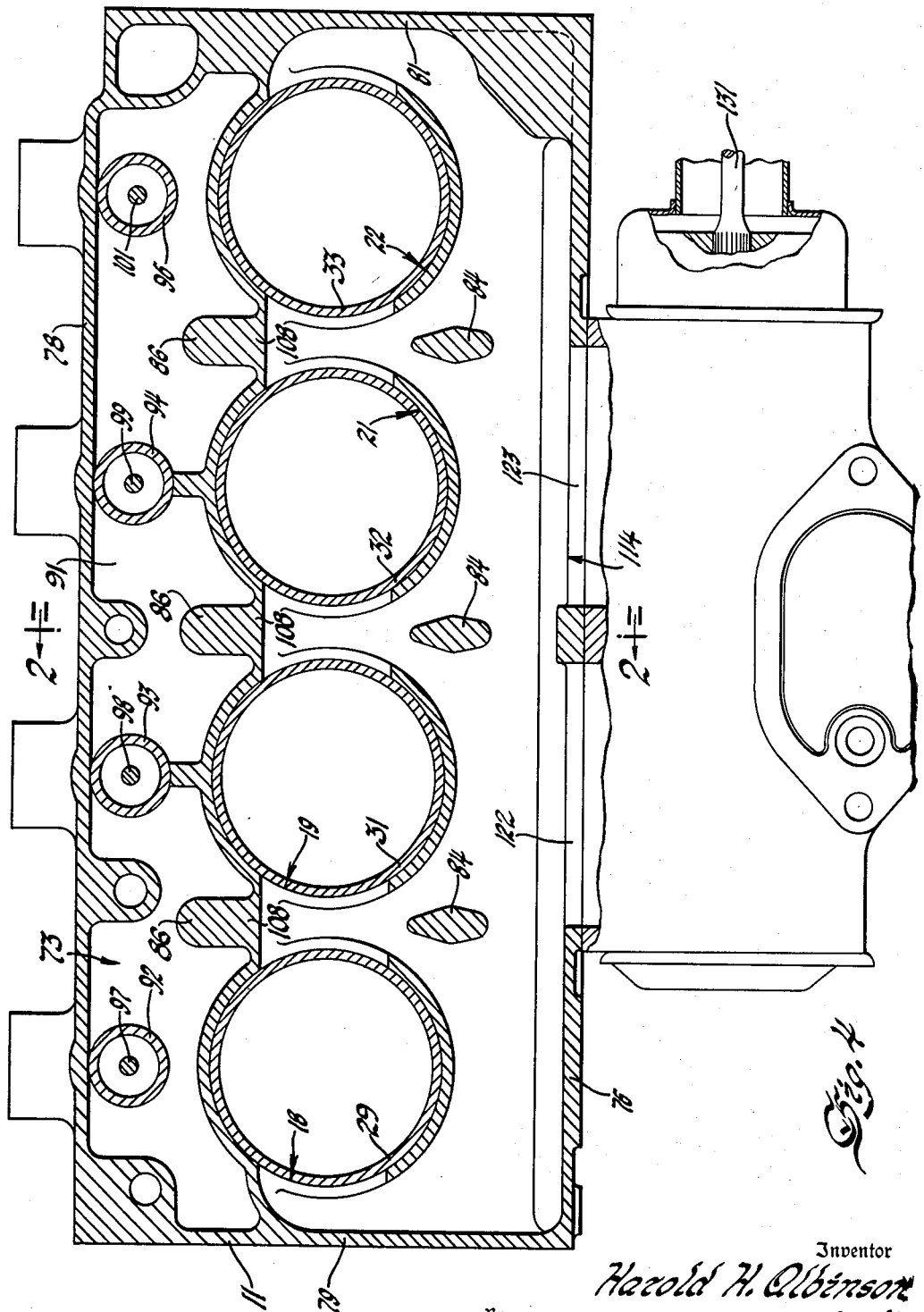
Inventor
Harold H. Albinson
By Willits, Helwig & Baillie
Attorneys

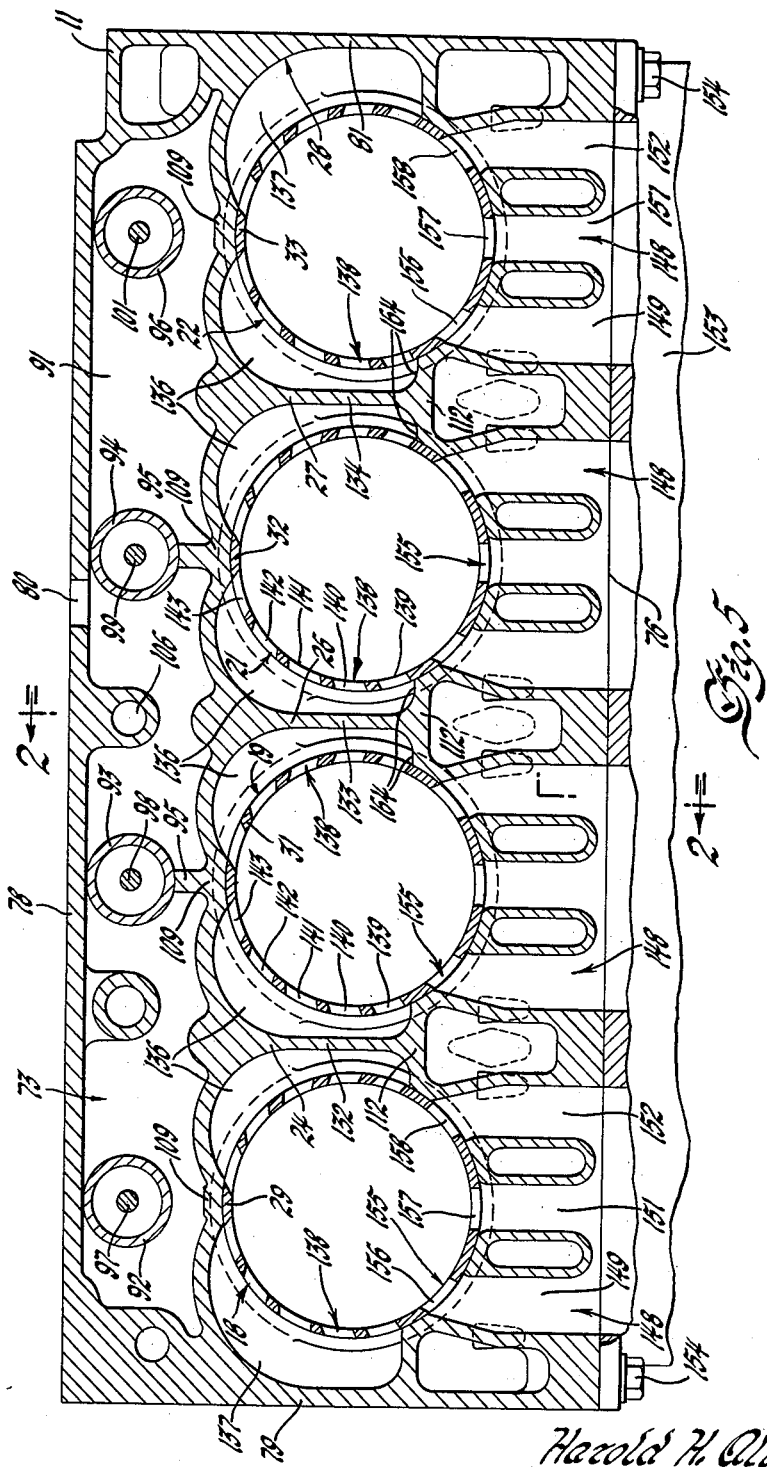

Dec. 27, 1955   H. H. ALBINSON   2,728,333
ENGINE EXHAUSTING, SCAVENGING, AND CHARGING SYSTEM
Filed April 22, 1950   5 Sheets-Sheet 5

Inventor
Harold H. Albinson
By
Willits, Helwig & Baillio
Attorneys

United States Patent Office 2,728,333
Patented Dec. 27, 1955

2,728,333

ENGINE EXHAUSTING, SCAVENGING, AND CHARGING SYSTEM

Harold H. Albinson, Detroit, Mich., assignor to General Motors Corporation, Detroit, Mich., a corporation of Delaware Application April 22, 1950, Serial No. 157,584

26 Claims. (Cl. 123—59)

This invention relates to internal combustion engines, and to the type of internal combustion engines in which pistons and cylinders are employed, and which operate on a two-stroke cycle, compression-ignition principle, and the invention has particular relation to engines of this type in which the cylinders are scavenged and charged by scavenging and charging means of novel construction.

An object of the invention is to provide a short, compact and light-weight engine of the compression-ignition type, which will be inexpensive to build, easy to service and economical in operation, and which will be applicable for use on busses, trucks, small boats and other similar land and water vehicles and apparatus.

Another object of the invention is to provide an engine having a novel blower, and scavenging and charging manifold arrangement and design, and, in which the air employed for scavenging and charging the cylinders of the engine will be supplied to the cylinders in relatively uniformly directed streams which may progress from the blower to each of the cylinders or from one cylinder to another, without being subject to turbulent and restricted movements which may cause the engine cylinders to be improperly scavenged and charged.

Another object of the invention is to provide a scavenging and charging manifold for an engine of the type referred to, and in which manifold the fluid will move inwardly and upwardly from the blower to the cylinders of the engine in predetermined paths of movement similar to the paths by which it is desired that the fluid should move within the cylinders for properly scavenging and charging the cylinders.

Another object of the invention is to provide a relatively short engine block; that is, a block in which the cylinders are arranged in such closely spaced relation to one another that it might be considered impossible to properly charge and scavenge the cylinders.

Another object of the invention is to provide a novel arrangement and construction of inlet and exhaust ports in the cylinders of internal combustion engines of the type referred to.

Another object of the invention is to provide an engine in which the scavenging and charging manifold employed is also utilized for the purpose of partially cooling the cylinders of the engine.

Another object of the invention is to provide a scavenging and charging manifold which provides an upper wall for the crankcase of the engine, and which manifold is so arranged in the block of the engine that the excessive heat from the exhaust passages and from the head ends of the cylinders of the engine, does not appreciably affect the temperature of the manifold and consequently does not appreciably tend to expand the scavenging and charging fluid supplied by the manifold to the cylinders, and, before the closing of the inlet ports of the cylinders.

Another object of the invention is to provide an engine of the type referred to in which the scavenging and charging manifold is so constructed as to prevent the exhaust gas from the cylinders of the engine, which under certain conditions of operation of the engine may be discharged through the inlet ports of the engine and into the inlet manifold referred to, from contaminating the scavenging and charging fluid in the manifold and to such an extent that the fluid so contaminated may be employed in charging a different one of the cylinders of the engine.

Another object of the invention is to provide a single branch or inlet passage leading to the opposite sides of each of the cylinders of an engine of the type referred to, and which passage is continuously and uniformly curved between the inlet to the passage and the outlet openings from the passage and to each cylinder, thereby preventing excessive turbulence during the movement of the scavenging and charging fluid toward each of the cylinders, and between adjacent cylinders, in the event there is any reverse movement in any part of any of the passages.

Another object of the invention is to provide an engine block construction in which the block will be reinforced between the cylinders and the opposite side walls of the engine, throughout the length of the engine, and in which structurally weak portions of the cylinders which have been cut out to facilitate the operation of the engine, will be strengthened by the reinforcement means employed between the cylinders.

Another object of the invention is to provide for the scavenging and charging of the cylinders of an engine of the type referred to, by the employment of streams of relatively high velocity scavenging and charging fluid, which will continue to flow from without to within the cylinders in linear or in uniformly and continuously curved and generally parallel paths.

Another object of the invention is to supply scavenging and charging fluid to the cylinders of an engine of the type referred to, and in relatively uniformly curved paths which extend from the front of a cylinder, around the cylinder in each direction and in upward directions, and in which paths the fluid progresses into the cylinder through a plurality of ports in which the walls of the ports are shaped to continue to direct the fluid within the interior of the cylinder in streams that follow, as nearly as possible the general paths of movement of the fluid externally of the cylinder.

Another object of the invention is to provide an engine cylinder with oppositely disposed inlet ports for inwardly and upwardly directing a plurality of streams of scavenging and charging fluid within the cylinder, and in which cylinder these streams are directed to intersect or to impinge upon one another upon a radius of the cylinder and upon the side of the cylinder opposite the exhaust ports and from which ports the expanding products of combustion within the cylinder are being discharged.

Another object of the invention is to provide a strong and relatively lightweight engine block for engines of the type referred to.

Another object of the invention is to exhaust and to charge the cylinders of compression-ignition internal combustion engines in the shortest possible time and by the use of a minimum quantity of charging and scavenging fluid.

Another object of the invention is to exaust and charge the cylinders of compression-ignition internal combustion engines by providing a relatively smooth and continuous flow of scavenging and charging fluid from the blower employed for supplying such scavenging and charging fluid, and to supply such fluid in a plurality of smoothly curved and relatively uninterrupted paths of fluid movement, extending between said blower and the exhaust ports for the engine.

Another object of the invention is to eliminate sharp corners and eddy currents resulting from such sharp corners, in the charging and exhausting system of an internal combustion engine operating upon the compression-ignition principle of operation.

In compression-ignition engines as these engines heretofore have been constructed, it has been the practice to provide exhaust ports on one side of each of the cylinders and to provide inlet or charging and scavenging ports throughout the remaining distances around the cylinders in both directions from the exhaust ports of the cylinder. The walls of the inlet ports have been so formed that the charging and scavenging fluid introduced by the inlet ports was directed radially inwardly within the cylinders and sometimes upwardly and radially inwardly within the cylinders. It has generally been considered necessary to create turbulence in the cylinders after the exhaust ports have been opened and after the scavenging fluid has been introduced into the cylinders through the inlet ports of the cylinders. Apparently it was reasoned that such turbulence would tend to circulate the exhaust fluid in the cylinders in eddy currents throughout all parts of the cylinders above the pistons and that these eddy currents would tend to cause the exhaust fluid to become entrained within the scavenging and charging fluid passing through the cylinders from the inlet to the exhaust ports of the cylinders. It was thought that these eddy currents would prevent the formation of pockets in the cylinders where nothing but exhaust gases would be collected and that the exhaust gases in any such pockets would be diluted and mixed with the scavenging and charging fluid in these turbulent eddy currents of scavenging fluid.

The results of this kind of scavenging and charging of the cylinders of compression-ignition engines has not been very satisfactory.

One of the reasons such scavenging and charging of cylinders has not been satisfactory is that this process measured in angularity of crankshaft movement has been relatively slow; that is the cylinders have been required to move excessive distances downwardly and upwardly within the cylinders before anything resembling a suitably charged cylinder has resulted. In other words, the cylinders have not been completely filled with fluid supplied by the inlet ports of the cylinders when the scavenging and charging process has been completed. A large amount of exhaust gas from a preceding cycle has remained in the cylinders to contaminate and dilute the charging fluid intended to be employed in the succeeding cycle of operations.

Another objection to such scavenging and charging systems has been that scavenging and charging fluid has been supplied to the inlet ports for the cylinders in what might be called highly turbulent and compressed bodies of fluid which, when released in the cylinders, tend to travel in practically all directions when the inlet ports to the cylinders were opened. Such highly turbulent masses or bodies of scavenging and charging fluid have resulted from bringing the scavenging and charging fluid to the regions outside the inlet ports for the cylinders through manifolds and passages containing abrupt corners and having many changes in shape, size and direction. Each of these corners, and changes in shape, size and direction tended to disturb the flow of fluid in these manifolds to an extent that the fluid could not continue to flow within the cylinders in the directions in which it was intended to be directed. Then, when the inlet ports of any cylinder would close, it might be necessary for the fluid adjacent that cylinder to commence movement in the direction of another cylinder and the paths of flow for such fluid between such cylinders also have been interrupted by corners, and changes in the shape and the size of passages, so that practically all of the fluid in a manifold of such kind and type might be described as a turbulent mass of fluid tending to flow within and from the manifold in all directions.

It is proposed to construct an internal combustion engine operating upon a compression-ignition cycle, in such a way that a blower for compressing the scavenging and charging fluid for the engine will discharge a relatively elongated blast of fluid into an inlet manifold that extends throughout the length of the cylinders and adjacent the lower extremities of the cylinders. It is proposed to have this blast of fluid enter the manifold in substantially the direction in which the fluid is intended to flow within and from the manifold, so that the fluid introduced into the manifold will not be in the form of a turbulent mass or body of fluid when it reaches the inlet ports for the cylinders.

The manifold for the engine is to be formed along one side of each of the cylinders and around the lower extremities of each of the cylinders so that the fluid may flow within the manifold and between the inlet ports for different cylinders, or to and from the inlet ports on the opposite sides of the same cylinder, in relatively smoothly curved paths of movement, around and beyond the lower cylindrically curved parts of the cylinder.

It has been considered desirable in this engine to have the scavenging and charging fluid move upwardly within each cylinder on the back or rear side of each cylinder, such being the side of the cylinder opposite the exhaust ports for the cylinder and opposite the inlet manifold for all of the cylinders. The inlet manifold will be located below the exhaust ports for all of the cylinders.

It is proposed to have such fluid continue to move upwardly on the rear side of each cylinder until the fluid in the cylinder strikes the head of the cylinder and then moves across the cylinder head and downwardly on the front side of the cylinder to be there discharged through the exhaust ports for the cylinder. Since it is proposed to have the fluid in the cylinders move upwardly and toward the rear of the cylinders, it is also proposed to have the fluid before reaching the cylinders move in similar upwardly and rearwardly directed paths of movement, and the inlet manifold for the engine therefore is constructed in such a way as to provide such movement. It is therefore proposed to construct the inlet manifold for the engine between upwardly and rearwardly inclined walls formed throughout the length of the engine and extending between and around the cylinders of the engine to the regions adjacent the inlet ports for the engine. The fluid in the inlet manifold therefore can move from the blower to the inlet ports for the engine in substantially the directions in which the inlet ports are adapted to introduce the fluid into the cylinders of the engine.

The inlet ports are formed in each of the cylinders in such way as to direct the fluid from the inlet manifold upwardly and rearwardly within the cylinders so as to provide ascending or upwardly directed columns or bodies of scavenging and charging fluid within the cylinders and at the rear of or behind the central axes of the cylinders, so that these columns or bodies of fluid may continue to ascend until the direction of flow thereof is changed by the heads of the cylinders. When these bodies of fluid encounter the heads of the cylinders, the fluid therein will be directed forwardly against the heads of the cylinders and will strike the front sides of the cylinders to form descending bodies of fluid within the cylinders. These descending bodies of fluid will continue to flow downwardly within the cylinders until the pistons of the cylinders direct the fluid in such bodies forwardly and outwardly through the exhaust ports which are formed in the front sides of the cylinders.

The particles of fluid in these ascending and descending bodies of fluid which are formed at the rear and front sides of each of the cylinders respectively, will tend to flow in relatively straight lines until interrupted by opposing surfaces and then will tend to flow in other straight lines until interrupted by other surfaces or until expelled from the exhaust ports of the engine. Such straight line flow of particles of fluid within the engine will tend to scavenge the cylinders of the engine without causing eddy currents of fluid in the cylinders and will immediately and quickly exhaust the cylinders of the engine of all exhaust fluid resulting from a previous cycle of operations of any of the cylinders.

Since the fluid does not tend to flow through the cylinders for any great length of time when such time is measured by movement of the pistons in the cylinders, it will be apparent that it is possible to provide shorter exhaust and inlet ports in the cylinders than have heretofore sometimes been employed, thus providing a greater amount of space in each of the cylinders for compressing new charges in the cylinders, than heretofore has been provided. Also the smaller quantity of scavenging fluid required for removing the exhaust gases from the cylinder will permit the use of a smaller blower which will in turn require less of the power of the engine for operating the blower. Since this process of scavenging will tend to remove practically all of the exhaust gas from the cylinders of the engine before the compression of a new charge of fluid commences within the cylinders, it will be apparent that a greater quantity of fluid capable of uniting in combustion with the fuel injected into the cylinders of the engine, will be provided.

Since the internal losses due to turbulence in the inlet manifold and in the cylinders will be greatly reduced by providing what might be called unidirectional flow of fluid in the inlet manifold and the cylinders of the engine, it will be apparent that the efficiency of the engine will be greatly increased.

Also due to the fact that the cylinders will be completely scavenged between each cycle of operation of the cylinders and will be filled with new and undiluted charges of fluid for uniting in combustion with the fuel injected into the cylinders, it will be apparent that more power may be developed in any such engine of any given speed and piston displacement characteristics.

For a better understanding of the invention, reference may now be had to the accompanying drawings forming a part of this specification and in which:

Figure 2 is a fragmentary transverse sectional view of the engine illustrated by Figure 1. Figure 2 is taken in the plane of line 2—2 on Figure 1 looking in the direction of the arrows thereon.

Figure 3 is a fragmentary vertical sectional view of a portion of the structure illustrated by Figure 2. Figure 3 is taken in the plane of line 3—3 on Figure 2 looking in the direction of the arrows thereon.

Figure 4 is a horizontal sectional view through the engine illustrated by the preceding figures. Figure 4 is taken in the planes outlined by line 4—4 on Figure 2 looking in the direction of the arrows thereon.

Figure 5 is another horizontal sectional view of the structure of the engine disclosed by the preceding figures. Figure 5 is taken in the planes outlined by the line 5—5 on Figure 2 looking in the direction of the arrows intersecting the ends of the line.

Figure 6:
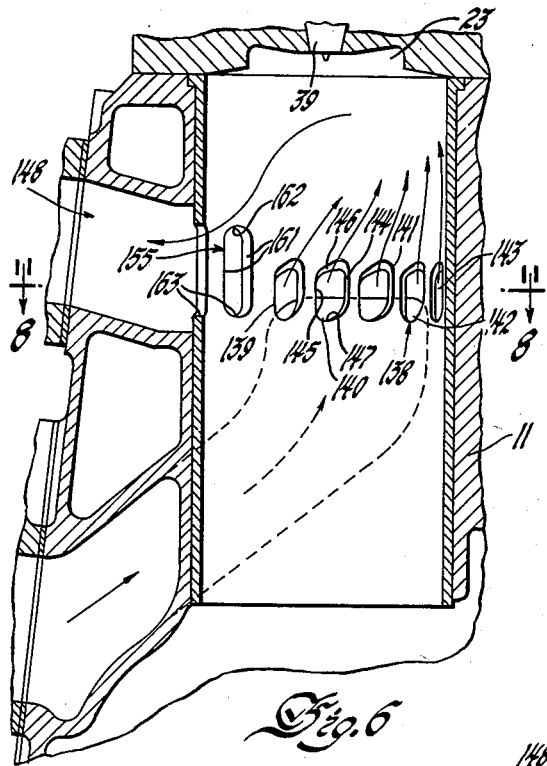
Figure 7:
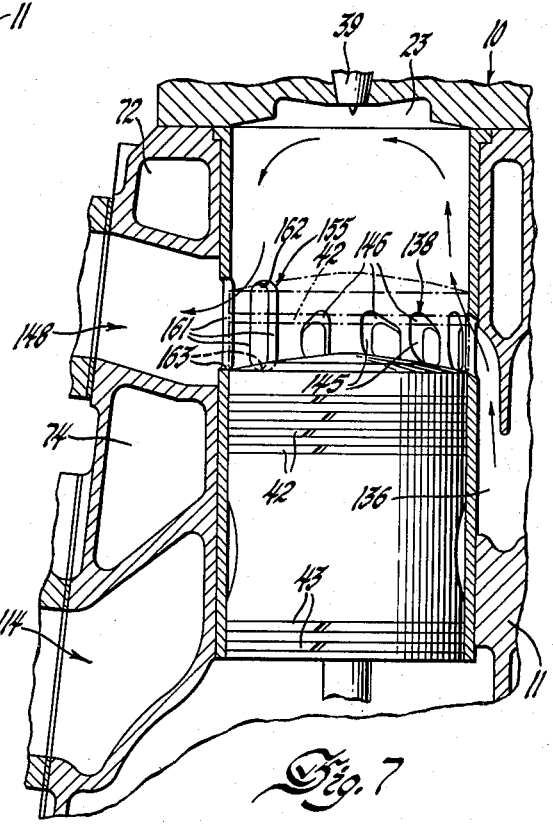
Figure 8:
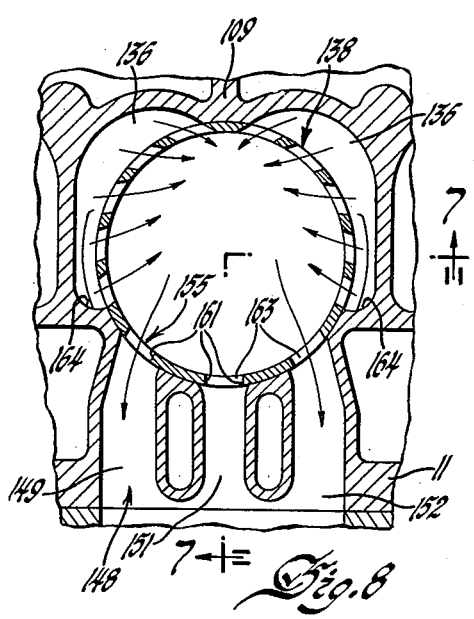

Figures 6, 7, and 8 are diagrammatical views illustrating by arrows the flow of fluid in an engine embracing the invention.

Figure 1:
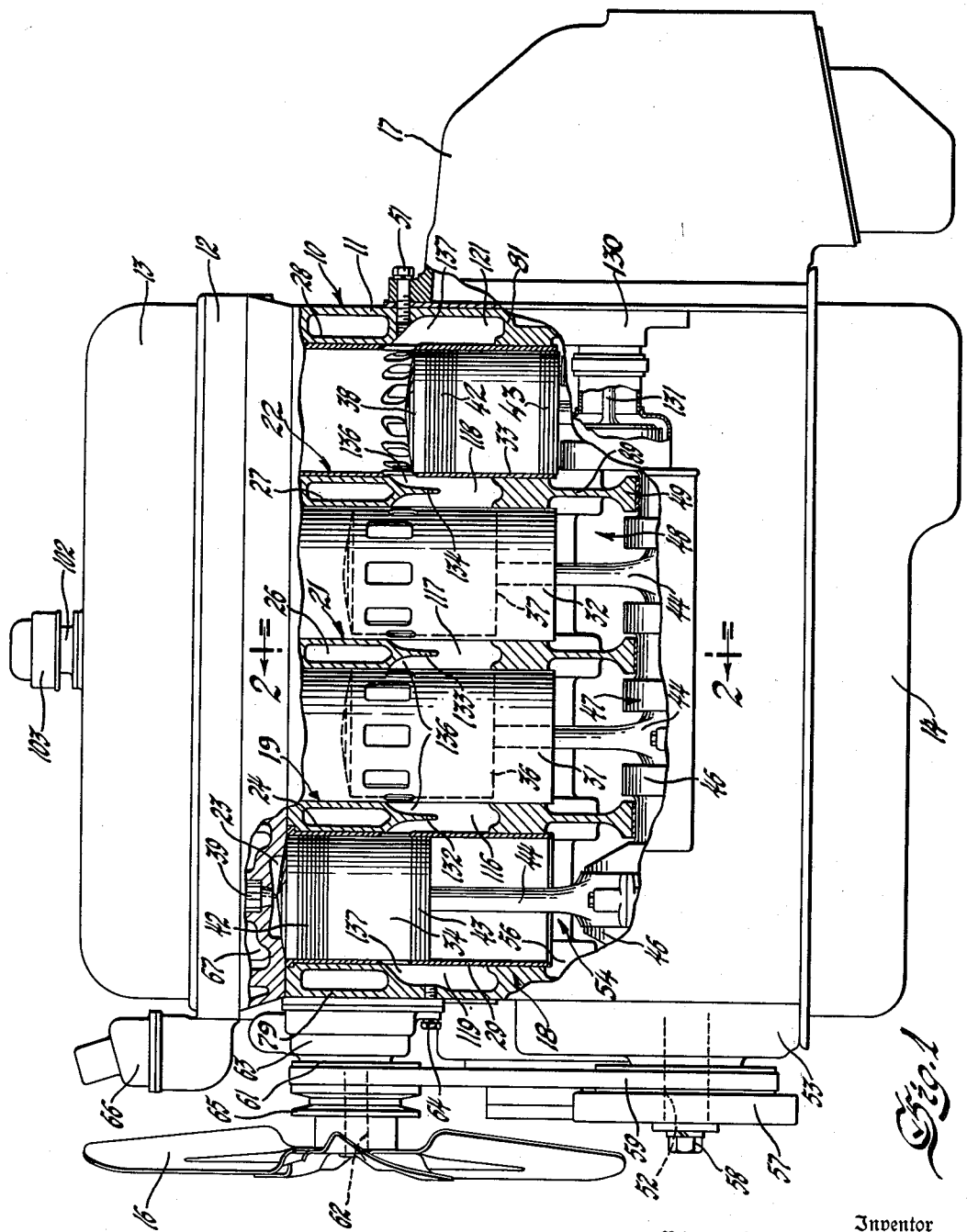
Figure 1 is a side elevational view having parts thereof broken away and shown in vertical sectional view, and illustrating an engine embracing the principles of the invention.

Referring particularly to Figure 1 of the drawings, there is illustrated an engine 10 comprising an engine block 11, a head 12, a rocker arm cover 13, a crankcase cover or pan 14, an engine fan 16 and a transmission and clutch mechanism indicated generally at 17.

The block 11 and head 12 of the engine are formed in such a way as to provide a plurality of parallel cylinders indicated at 18, 19, 21, and 22. In the head end of each cylinder is formed a compression chamber, and one of which chambers is indicated by the numeral 23.

The cylinders 18, 19, 21, and 22 each comprise cylinder shells indicated at 24, 26, 27, and 28 which are formed inside the block 11 in spaced relation to one another and to the walls of block 11. From the upper open ends of the block 11 the shells 24, 26, 27, and 28 are adapted to receive and have impressed therein cylinder sleeves which are indicated at 29, 31, 32, and 33 respectively. The sleeves 29, 31, 32, and 33 are adapted to receive and have slidably mounted therein pistons which are indicated at 34, 36, 37, and 38, for compressing and expanding combustible charges within the cylinders respectively indicated at 18, 19, 21, and 22. When compressed into the compression spaces indicated at 23, such charges are adapted to be ignited by compression-ignition of the charges, the engine being operable according to the two-stroke cycle compression-ignition principle of operation of such engines. Liquid fuel employed in forming the charges is adapted to be injected into the compression spaces 23 of the cylinders by injection valves indicated at 39, there being one of the injection valves for each of the cylinders indicated at 18, 19, 21, and 22.

The pistons 34, 36, 37, and 38 have piston rings indicated at 42 and 43, such rings being inserted in grooves formed around the outside surfaces of the pistons and adjacent the upper and lower extremities of each of the pistons.

The pistons 34, 36, 37, and 38 are connected by connecting rods 44 to crank or throw portions 46 of a crankshaft indicated generally at 47. The throw portions 46 are disposed in longitudinally spaced relation to one another and one of such throw portions is disposed opposite each of the cylinders indicated at 18, 19, 21, and 22. The throw portions 46 also are angularly disposed about the axis of rotation of the crankshaft 47 so that the cylinders 18, 19, 21, and 22 can be operated in suitably timed and balanced relation to one another. The block 11 has a portion thereof below the cylinders 18, 19, 21, and 22 formed to provide a crankcase indicated at 48 and in which the crankshaft 47 is adapted to be rotatably mounted on crankshaft bearings indicated at 49 and which are formed in the crankcase between each of the cylinders 18, 19, 21, and 22 and at the front and rear ends of the block 11. The crankshaft 47 is adapted to project through the rear of the block 11 and into the housing of the transmission 17 and from which a propeller shaft, not shown, is adapted to project rearwardly of the engine for driving the vehicle, boat, or other apparatus or device, and, for which the engine is employed as a source of power.

The housing of the transmission 17 may be removably secured at the rear end of the casing by bolts indicated at 51 and likewise the cover 13 and the oil pan 14 may be removably secured to the upper and lower extremities of the engine respectively by any suitable means, not shown.

The forward end of the crankshaft 47 has a portion thereof projecting through the crankcase 11 to provide a stub shaft indicated at 52. Removably secured to the lower front end of the block 11 and having the stub shaft 52 projecting therethrough is a drive gear mechanism casing 53 in which is enclosed a drive gear mechanism for driving a camshaft 54 which is disposed on one side of the block 11 and adjacent the lower extremities of the cylinders 18, 19, 21, and 22. The camshaft 54 is supported in the block 11 by bearings indicated at 56 and is formed integrally with respect to one side and the two ends of the block 11 and the lower extremities of the cylinder shells indicated at 24, 26, 27, and 28. Also located within the casing 53 and driven by the stub shaft 52 is a lubricating oil circulating pump which is employed in the forced lubrication of the various moving parts of the engine.

Beyond the casing 53 the stub shaft 52 supports a flywheel and driving pulley indicated at 57 which is secured to the stub shaft 52 by a nut indicated at 58. The pulley part of the flywheel and pulley indicated at 57 drives a belt 59, the opposite end of which is adapted to drive a pulley 61 supported on the front end of a stub shaft indicated at 62. The stub shaft 62 is secured to the front end of the block 11 by means not shown, but contained within a casing 63 which is removably secured to the block by studs indicated at 64. The casing 63 forms the outside wall of a water pump for circulating cooling liquid to the various heated parts of the engine for cooling the engine. Fan 16 is secured to the front end of the stub shaft 62 beyond pulley 65 which may be employed for the purpose of driving a generator for the electrical system of the engine. Fan 16 is adapted to draw air through a radiator which may be located in front of the fan 16 and which is adapted to be employed for the purpose of dissipating the heat rejected by the engine and absorbed by the cooling liquid circulated in the engine. The fan 16 also discharges a blast of air over the entire exterior surface of the engine for the purpose of absorbing the heat dissipated directly by the exterior surface of the engine. The radiator referred to is adapted to receive the cooling liquid from the engine through a discharge coupling indicated at 66 and which coupling is secured by any suitable means, not shown, to the front end of the head 12 and in open communication with cooling liquid circulating cavities within the head 12 and indicated by the numeral 67. Cooling liquid is supplied to the cavities 67 within the head 12 by a plurality of pairs of communicating passages indicated by the numeral 69, these passages being formed in the head 12 and the block 11 between each of the cylinders indicated at 18, 19, 21, and 22, and between the cylinders 18 and 22 and the opposite ends of the block 11. The passages 69 communicate with connecting passages 71 extending between cylinder cooling cavities 72 and 73 which are formed in the block 11 on opposite sides of the cylinders 18, 19, 21, and 22. The engine water pump contained in the housing 63 is adapted to circulate water from the lower part of the engine radiator through one of the cavities 73 and a cooling liquid supply passage 80, to a cooling liquid distribution manifold indicated at 74. The manifold 74 is formed at the lower extremity of the cooling cavity indicated by the numeral 72 and extends from one end to the other of the block 11 on one side of the cylinders 18, 19, 21, and 22 and adjacent the lower extremities of the cylinders. Liquid supplied to the manifold 74 circulates upwardly within the cavity 72, through exhaust cooling passages indicated at 75, fills the cavity 73 through connecting passages 71, and circulates outwardly from the cavity 72 through connecting passages 71 and the outlet openings indicated at 69. The cooling liquid supplied to the cavities 73 circulates between the cylinders 18, 19, 21, and 22 and the adjacent outer wall of the block 11 and from the block through passages 69.

The exterior surfaces of the block 11 are formed by a pair of side walls indicated at 76 and 78, front and rear walls indicated at 79 and 81 respectively, and top wall indicated at 82. The head 12 is adapted to be removably secured to the top 82 of the block 11 by bolts or screws indicated at 83 and which project through the wall 82 into threaded openings formed in the upper extremities of integral columns 84 and 86. The columns 84 and 86 are formed in the block 11 between the cylinders 18, 19, 21, and 22 and the side walls 76 and 78 of the block 11. The columns 84 and 86 extend between the top wall 82 and the opposite ends of the upper parts 87 of the crankshaft bearings 49. The upper parts of the bearings indicated at 87 are formed integrally with the lower extremities of the columns 84 and 86 and with the sides, end walls and the cylinder shells of the block 11, while the lower parts 88 of the bearings 49 are removably secured by bolts 85 to the upper parts 87 to facilitate the service and assembly of the engine 10. The upper parts 87 of the bearings 49 are integrally secured to the side walls 76 and 78 and to the columns 84 and 86 and between the cylinders 18, 19, 21, and 22 by web walls indicated at 89.

The cooling liquid cavities 73 which are formed on one side of the block 11 are separated from the crankcase 48 of the engine by a web or partition wall 91 which extends from one end to another of the block 11 and from the side wall 78 to the lower extremities of the cylinder shells indicated at 24, 26, 27, and 28. Extending through the cavities 73 from the upper wall 82 of the block 11 and to the web wall 91 is a plurality of tubular members indicated at 92, 93 94, and 96. Tubular members 93 and 94 and ribs indicated at 95 and projecting from the side wall 78 and cylinder shells 26 and 27, separate the cavities 73 from one another. Push rods 97, 98, 99, and 101 are adapted to extend through tubular members 91, 92, 93, and 94 for operation by the cam-shaft 54 and for operating rocker arms which are mounted on a rocker shaft contained within a cover 13. The rocker shaft is employed in operating the injection valves indicated at 39.

Oil for filling the crankcase 48 and for circulation throughout the lubricating system of the engine 12 is supplied to the interior of the cover 13 through a flanged inlet fitting 102 which is adapted to be closed by a cap or cover indicated at 103. The oil so supplied to the cover 13 is adapted to flow along the upper surface of the head 12 from one end to the other of the cover 13 and then to the crankcase 48 through the tubular members indicated at 92, 93, 94, and 96. The engine also is provided with an oil cooler indicated at 104 which is secured to the side wall 78 of the block 11 by means not shown. The oil cooler 104 is adapted to supply oil to the camshaft 54 and to the rocker arms and shaft contained within the cover 11 through passages indicated at 106 and formed in the block 11 adjacent the side wall 78.

The upper extremity of the crankcase 48 is formed by an inclined wall indicated at 107 and by the partition wall 91. The wall 107 is formed integrally with respect to and adjacent the lower edge of the side wall 76 and slopes upwardly from the side wall 76 and is intersected by the columns 84 and 86 and by the cylinder shells 24, 26, 27, and 28 and is formed integrally with respect to the columns and the lower parts of the shells. The upwardly sloping parts of the wall 107 which extend between the cylinder shells 24, 26, 27 and 28 also are formed integrally with respect to the adjacent edge of the partition wall 91. Beyond the partition wall 91 the wall 107 turns upwardly at 108 and extends around and to the rear of the cylinder shells and is formed integrally with a vertical portion of each of the cylinder shells as is indicated at 109.

Spaced directly above the wall 107 is another inclined wall indicated at 111, which also is formed integrally with the side wall 76, is intersected by the columns 84 and the cylinder shells 24, 26, 27, and 28, and, extends between the cylinder shells and is formed integrally with the shells and with the columns 84 and 86. The upper extremity of the wall 111 curves upwardly at 112 to provide a front wall portion between each of the cylinder shells which is substantially parallel to the upwardly curved wall 108 extending beyond the wall 107. The upwardly curved walls or wall portions 108 and 112 extending beyond the walls 107 and 111 respectively are connected at the tops or upper extremities thereof by a transversely disposed wall 113, the sections of which wall extend between the cylinder shells 24, 26, 27, and 28 and the shells 24 and 28 and the end walls 79 and 81, and, are connected to the shells and to the walls referred to by being formed integrally with respect thereto. The walls 107, 111, 108, 112, 113, the intercepted portions of the side walls 76, the end walls 79 and 81, and the cylinder shells 24, 26, 27, and 28 form interiorly thereof, an inlet manifold 114 having branches 116, 117, and 118 extending between the cylinders 18, 19, 21, and 22 and branches 119 and 121 extending between cylinder shell 18 and end wall 79 and cylinder shell 22 and end wall 81, all respectively.

Side wall 76 has a pair of elongated openings 122 and 123 formed between the exterior of the block 11 and the central portion of the inlet manifold 114. These openings 122 and 123 communicate with a distribution portion 124 of inlet manifold 114, such distribution portion being adapted to extend from front to rear of the block 11 and to merge and to communicate with each of branches indicated at 116, 117, 118, 119, and 121. The openings 122 and 123 extend throughout a considerable portion of the length of the distribution portion 124 of the manifold 114 to be able to supply all of the manifold branches without having internal pressure and turbulence develop in the ends of the manifolds and in other regions remote from the openings 122 and 123.

The manifold 114 is supplied through the openings 122 and 123 with scavenging and charging fluid which is delivered directly to the openings by rotating impellers 125 and 126 which are adapted to revolve on parallel shafts 127 mounted in the end walls of a casing 128 of a blower which is indicated at 129. The blower 129 has an inlet through the casing 128 on the side of the casing opposite the outlet openings 122 and 123 and is secured to the side walls 76 of the block 11 by screws or other suitable means, not shown. The blower 129 has a drive shaft indicated at 131 which drives the impellers 125 and 126 through gears mounted on the shafts of the impellers and within extended portions of the end of the blower housing through which the shaft 131 extends. The shaft 131 projects within a gear housing indicated at 130 and is there driven by drive mechanism which is in turn driven by a rearwardly extending portion of the crankshaft 47 of the engine 10.

The upper extremities of the branches 116, 117, and 118 of the inlet manifold 114 which extend between the cylinders 18, 19, 21, and 22 respectively are separated by partitions 132, 133, and 134 which extend downwardly from the portions of the upper wall 113 which extend between the cylinder shells referred to. The partitions 132, 133, and 134 extend downwardly into the upper extremities of the branches 116, 117, and 118 respectively to provide relatively separate inlet chambers indicated at 136 and one of which is provided on opposite sides of each of the partitions for adjacent sides of the cylinders 18, 19, 21, and 22. The end walls 79 and 81 of the block 11 also are formed at the upper extremities of branch passages 119 and 121 to provide inlet chambers 137 which are disposed between the cylinders 18 and 22 and the end walls 79 and 81 respectively. It will be apparent from Figure 5 of the drawing that the inlet chambers 136 and 137 for all of the cylinders 18, 19, 21, and 22 are separated from one another at the rear of each of the cylinders by merging portions 109 of the wall 108 and the cylinder shells 24, 26, 27, and 28.

Each of the cylinder sleeves which are indicated by the numerals 29, 31, 32, and 33 is formed to provide a pair of groups of inlet ports indicated generally by the numeral 138. The inlet ports in each group of inlet ports indicated at 138 are formed around the sleeves 29, 31, 32, and 33 in such a way that the lower extremities of the inlet ports will be just above the piston in each of the cylinders when such piston is at the end of the expansion stroke of such piston in each cylinder. The ports in each group of ports indicated at 138 are formed in spaced relation to one another and adjacent the upper extremities of the inlet passages indicated at 136 and 137. The inlet ports of each group of inlet ports indicated at 138 also are disposed throughout substantially the entire arcuate extent of each of the inlet chambers indicated at 136 and 137.

As is best shown by Figures 6, 7, and 8 of the drawing, the inlet ports of each group of inlet ports are indicated by the numerals 139, 140, 141, 142, and 143. Also each of the inlet ports 139, 140, 141, 142, and 143 of each of the groups of inlet ports indicated at 138, has side walls 144 and 145 and upper and lower walls indicated at 146 and 147 respectively. It will be further apparent from the drawing that when the side walls 144 and 145 of each of the ports 139, 140, 141, 142, and 143 of each of the groups of ports of each cylinder are geometrically extended within each cylinder, the walls of one group of ports within each cylinder will successively intersect the corresponding walls of the inlet ports of the other group of ports within each cylinder and behind the center of each cylinder and upon a radius of each cylinder terminating at the middle of cylinder shell portions indicated at 109.

It will also be apparent from inspecting the drawing that the upper and lower walls 146 and 147 respectively of each of the inlet ports 139, 140, 141, 142, and 143 of each group of inlet ports indicated at 138, are inclined upwardly towards the head ends of each of the cylinders 18, 19, 21, and 22 at angles which are approximately the same as the angles of inclination of the branch passages indicated at 116, 117, 118, 119, and 121 and of the upper extremities of the inlet chambers indicated by the numerals 136 and 137.

The cylinders 18, 19, 21, and 22 and the block 11 of the engine 10, also are provided with a plurality of groups of exhaust passages which are indicated generally by the numerals 148. Each group of exhaust passages indicated by the numerals 148 comprises spaced exhaust passages with corresponding passages in each group of the passages indicated by the numerals 149, 151, and 152. Each of the passages 149, 151, and 152 in each group of the passages indicated at 148 extends relatively horizontally from one of the cylinders 18, 19, 21, or 22 to the exterior surface of the block 11. Beyond the side wall 76 all of the groups of passages indicated at 148 communicate with the interior of an exhaust manifold 153 which is secured removably to the wall 76 by bolts indicated at 154.

The exhaust passages 149, 151, and 152 in each group of the exhaust passages indicated generally at 148 communicate with the interior of one of the cylinders 18, 19, 21, or 22, through exhaust ports indicated by the numerals 155. Corresponding ports in the groups of ports indicated at 155 are indicated by the numerals 156, 157, and 158. The exhaust ports 156, 157, and 158 are spaced from one another within the front part of each of the sleeves 29, 31, 32, and 33, and are similarly spaced from the groups of inlet ports in each cylinder indicated generally by the numerals 138.

Each of the exhaust ports 156, 157, and 158 comprises side walls indicated at 161, and upper and lower walls indicated at 162 and 163. The side walls of all of the ports 157 when geometrically projected inwardly of the cylinders will be disposed equidistantly on the opposite sides of the centers of each of the cylinders. However, the side walls of each of the ports 156 and 158 when geometrically projected within the cylinders will intersect the same radius of each of the cylinders as was intersected by the inlet ports in each of the groups of inlet ports indicated by the numerals 138. However, the top and bottom walls of the exhaust ports 156, 157, and 158 for each of the cylinders 18, 19, 21, and 22 are not sloped upwardly within the cylinders as are the upper and lower walls of the inlet ports in the groups indicated at 138. The upper and lower walls of the exhaust ports indicated at 156, 157, and 158, when projected externally of the cylinders 18, 19, 21, and 22, lie in planes which are parallel to the upper and lower wall surfaces of the passages 149, 151, and 152 respectively in each group of the exhaust passages indicated at 148. It will also be apparent from examining Figure 5 of the drawing, that the outside wall surfaces of each of the exhaust passages indicated by the numerals 149 and 152 in each of the groups of exhaust ports indicated by the numerals 148, do tend to slope outwardly in such a way as to correspond with the slope of the outer one of the walls of each of the exhaust ports 156 and 158 of the groups of exhaust ports indicated at 148.

In order to render it possible to place the cylinders in the block 11 as close together as is possible and to reduce the length of the block 11 as much as is possible, the cylinder shells which are indicated by the numerals 24, 26, 27, and 28, have aligned openings formed on opposite sides thereof and intermediate the upper and lower ends thereof, as is indicated by the numerals 164. The openings 164 are formed in the cylinder shells 24, 26, 27, and 28 from just below the sections of the wall 113 which extend between each of the cylinders of the engine, and from the front to the rear extremities of the inlet ports of the engine, and downwardly of the cylinders of the engine substantial distances below the lower extremities of the partition walls 133, and into the regions where the branch passages 116, 117, 118, 119, and 121 widen out between the cylinders of the engine and into the spaces where these branch passages approach and merge with the distribution chamber 124 of the inlet manifold 114. The openings 164 therefore widen the branch passages 116, 117, 118, 119, and 121 in the regions where such branch passages otherwise might be restricted by the closeness of the spacing of the cylinders of the engine and to such an extent that a reduction in the efficiency of the engine does not result.

However, the presence of the openings 164 does not tend structurally to weaken the cylinder shells indicated at 24, 26, 27, and 28. Such weakening of the cylinder shells does not occur for the reason that the columns 84 and 86 are positioned between each of the cylinders and on opposite sides of the cylinders and these columns and the end walls 79 and 81 of the block 11, provide reinforcements for the cylinder shells 24, 26, 27, and 28, where the columns and the end walls are intersected by the upwardly inclined walls 107 and 111 and by the partition wall 91. These intersected walls are integrally secured to the cylinder shells in regions above and below the openings 164 which are formed therein. The cylinder shells therefore have integral columns secured to the parts of the cylinders above and below the openings 164 therein, which reinforce the shells so that the weakening of the shells which might otherwise be caused by the openings 164 will not injuriously affect the shells. The columns 84 and 86 also reinforce the entire block between the cylinders and the oppositely disposed side walls of the block and tend to rigidly connect the bearings of the engine with all portions of the block above the engine and with the head of the engine.

When the engine is started, it will be apparent that the blower 129 will be actuated for discharging a blast of air from the casing of the blower and into the inlet manifold 114 through the openings 122 and 123. Such blast of air will spread out within the inlet manifold 114 throughout the entire extent of the distribution chamber 124 of the inlet manifold and will fill the branch passages 116, 117, 118, 119, and 121 of the inlet manifold 114.

As the rotating crankshaft of the engine moves the pistons of the engine upwardly and downwardly within the cylinders indicated at 18, 19, 21, and 22, each of the pistons and upon the expansion or downstroke of each of the pistons, will successively pass the exhaust and inlet positions of the pistons. At the end of the downstroke of each of the pistons, the end surfaces of the pistons will just uncover the lower extremities of the groups of inlet and exhaust ports indicated at 138 and 155 respectively. When the pistons move upwardly within the cylinders upon the compression stroke of each of the pistons, the pistons will successively move beyond the inlet and exhaust positions of the pistons for closing the inlet ports and the exhaust ports of the cylinders.

When any piston of the engine reaches the exhaust position of the piston on the downstroke of the piston, and uncovers the exhaust ports of the engine, the expanded products of combustion in the cylinder for such piston will immediately tend to escape through the upper extremities of the exhaust ports and to enter the exhaust passages in the groups of passages indicated at 148. The exhaust manifold 153 will collect the exhaust gases discharged by the exhaust passages in the groups indicated at 148 and will cause such exhaust gases to form a column or body of fluid flowing away from the engine. The individual exhaust passages indicated at 149, 151, and 152 in each group of exhaust passages indicated at 148 are so formed that the products of the combustion from the cylinders which expand through the exhaust ports of the cylinders, tend to fill the exhaust passages and, as the piston tends to move downwardly and to enlarge the openings through the exhaust passages, the products of combustion will tend to flow through the exhaust passages at increasing velocities. By the time the pistons in the successive exhausting cylinders have reached the end of the expansion stroke of each of the pistons, the waste products of combustion from all of the cylinders will have practically reached and passed through the exhaust ports of the cylinders and will have filled the exhaust passages of the engine. These exhaust products will tend to form in the exhaust manifold 153 a body or column of fluid moving away from the engine at a relatively high velocity. This moving column of fluid in the exhaust passages and the exhaust manifold of the engine will tend to continue to flow in the same direction and hence will tend to scavenge the exhausting cylinders by the force of inertia affecting the particles of matter in such moving column. This scavenging by inertia will tend to continue during the beginning of the compression stroke of the engine and until the exhaust ports of the successive exhausting cylinders are completely closed.

After the pistons have successively moved beyond the exhaust positions of the pistons in the cylinder, the pistons then start to uncover the inlet ports at the successive inlet positions of the pistons. The inlet ports first commence to open (see Figure 7) when the rings 42 at the head end of a piston first move below the upper edges of the inlet ports. When the rings have so uncovered the upper edges of the inlet ports, high velocity streams of scavenging and charging fluid from the inlet manifold 114 will then commence to be admitted to the cylinder through the annular space beyond the rings and from between the cylindrical end of the piston and the cylinder. Such admission of fluid will provide a plurality of thin, high velocity streams which will be directed within the cylinder in the directions in which the side walls and upper and lower walls of the inlet ports are directed. These streams therefore will be directed upwardly and rearwardly within the cylinder in approximately parallel relation to one another and between the mass or body comprising the products of combustion in the cylinder and the cylinder side walls. These streams will be directed upwardly and rearwardly along the side walls of the cylinder because streams of fluid, when first admitted to the cylinder, pass from the inlet ports while the cylindrical surface of the piston above the piston rings is directly above the inlet ports. The streams therefore will commence to be directed upwardly and rearwardly along the inside surfaces of the cylinder by the parallel surface of the annular head end part of the piston which is spaced only slightly inside of the surface of the cylinder. These streams therefore commence to open up passages between the products of combustion in the cylinder and the cylinder side walls and these passages continue to remain open and to enlarge as the piston moves further downwardly within the cylinder and into a position in which the upper surface of the piston is below the upper edges of the inlet ports. In such position, it might otherwise be possible for some of the fluid from the cylinder inlet passages to commence to flow across the head of the piston and in the direction of the exhaust ports of the cylinder. This does not happen because the streams of fluid in the cylinder have already commenced to travel in other paths within the cylinder and by reason of the sloping walls of the inlet ports, there is less resistance to the flow of fluid in these other paths than there would be to the flow of fluid across the cylinder in new paths. There is such less resistance because the fluid in the inlet passages for the cylinder which first commences to flow into the cylinder is that fluid in the inlet ports immediately adjacent the exterior surfaces of the piston and the fluid immediately adjacent the exterior surfaces of the cylinder and just below the inlet ports. It will be apparent from the drawing that the fluid in such regions can flow past the upwardly and rearwardly sloping surfaces of the inlet ports in the cylinder and between the products of combustion in the cylinder and the interior wall surfaces of the cylinder almost in straight lines. When fluid has once commenced to flow in such approximately straight lines the inertia of the particles of fluid in these high velocity streams of fluid will tend to cause the streams to continue to flow in the same paths of movement as the head surface of the piston moves below the upper extremities of the inlet ports and enlarges the openings through which fluid can flow into the cylinders. Also in order to flow across the upper surface of the piston and towards the exhaust ports of the piston it would be necessary for these thin high velocity streams of fluid to leave the walls of the cylinder and to flow directly into a turbulent body of exhaust products of combustion within the cylinder. The streams will not tend to do this when there is less resistance to the flow of these streams and when one side of each stream is in contact with a metallic surface. There is less resistance to the flow of a high velocity stream of fluid if the stream is prevented from expansion by contact with metallic surfaces than if the stream is free to expand in a gaseous fluid such as the exhaust products of combustion within the cylinder referred to. Since the streams have one side of each stream in contact with a portion of the inside wall of the cylinder there will be less resistance for the streams to continue to flow in such directions. The streams therefore will continue to flow upwardly and rearwardly within the cylinder as the piston moves beyond the inlet position of the piston and downwardly within the cylinder and increases the size of the inlet openings for increasing the size of the high velocity streams of scavenging and charging fluid so entering the cylinder.

When the high velocity streams of fluid referred to first commence to be admitted to any cylinder they will tend to move upwardly and rearwardly and spirally around the interior surface of the cylinder and toward the rearwardly and centrally disposed part of the cylinder which extends between inlet ports 143 in each of the groups of ports 138 in the cylinder. It will be apparent from Figures 5 to 8 of the drawing that the spirally directed streams of fluid from inlet ports 143 will soon meet or impinge upon one another along a vertically disposed line within the cylinder and at the back of the cylinder and midway between the two inlet ports 143. These streams will meet to form an upwardly directed body of fluid adjacent the rear wall of the cylinder, that will continue to move upwardly within the cylinder until it engages the head end of the cylinder. Further examining the drawing it will be apparent that the spirally directed streams of fluid from inlet ports 142 in each of the groups of ports 138 in the cylinder will also impinge upon opposite sides of the upwardly directed body of fluid referred to and will enlarge such body by adding thereto the fluid contained in the streams of fluid from inlet ports 142. Likewise the streams of fluid from the inlet ports 141, 140, and 139 in each of the groups of inlet ports 138 in the cylinder will successively impinge upon and enlarge the upwardly directed or ascending body of fluid referred to as being formed adjacent the rear wall of any cylinder.

Further, as will be apparent from the drawing, the oppositely disposed streams of fluid from the inlet ports 143, 142, 141, 140, and 139 in the groups of inlet ports on opposite sides of a cylinder successively form and join the ascending body of fluid formed at the rear wall of the cylinder and as the piston continues to enlarge the openings through the inlet ports, the body of fluid will enlarge and will expand towards the front of the cylinder and to such an extent that when the inlet ports are finally fully opened by the piston such ascending body of fluid will occupy practically all of the cylinder behind the center or axis of the cylinder and around the walls of the cylinder in opposite directions from the inlet ports 143 and between the inlet port 139 of each group of inlet ports 138 within the cylinder.

It will be further apparent from the drawing that the part of this ascending column of fluid being formed at the rear of the cylinder which will first engage and be deflected by the head of the cylinder will be the part formed by the streams of fluid from the oppositely disposed inlet ports indicated at 143. Such part of the body of fluid will engage the head end of the cylinder and will be deflected across the head end of the cylinder and into engagement with the front wall of the cylinder in the region immediately above the exhaust port 157 within the cylinder. When the body of fluid formed by the streams from the inlet ports 143 strikes the front of the cylinder it will be deflected downwardly within the cylinder and adjacent the front wall of the cylinder to form a descending body of fluid within the cylinder. This body of fluid will continue to flow downwardly until it reaches the exhaust port 157 for the cylinder and is entrained in and becomes a part of the stream of exhaust products of combustion which is flowing outwardly through all of the exhaust ports. As the ascending body of fluid is enlarged by being successively joined by the streams of fluid from the oppositely disposed pairs of inlet ports indicated at 142, 141, 140, and 139, the enlarged body of fluid so formed will also follow the path referred to as being formed by the streams from the inlet ports 143. As the streams forming this enlarged body of fluid successively engage the head of the cylinder and move across the cylinder to the front of the cylinder and downwardly within the cylinder, both the ascending and descending bodies of fluid within the cylinder will soon fill the cylinder and will sweep out of the cylinder in front of such enlarging bodies of fluid practically all of the exhaust products of combustion which the cylinder contains.

It will be apparent from further examining the drawing and from a consideration of the time required to completely open both the inlet and the exhaust ports of the cylinder that these ascending and descending bodies of fluid will practically fill the cylinder before the exhaust and inlet ports are entirely opened. The cylinder, therefore, will be completely scavenged by these ascending and descending bodies of fluid as soon as these bodies of fluid have filled the cylinder as previously described.

Thereafter during the compression stroke of the engine both the inlet ports and the exhaust ports will be cut off by movement of the piston beyond the inlet and the exhaust positions of the piston and a new and uncontaminated charge of fluid will be compressed in each cylinder.

It will be apparent from observing the size and shape of the body of fluid contained within the inlet manifold 114, and including the distribution passage and the various branch passages and the inlet passages leading to the inlet ports for each cylinder of the engine, that all of these passages contain a relatively large body of fluid which can move freely to the inlet ports of any cylinder of the engine, and to and from the inlet ports of different cylinders of the engine, and without encountering restrictions or engaging sharp corners or turns in the manifold, which might tend to cause turbulence within the fluid body, or highly variable velocities in different parts of the fluid body.

It will also be apparent that not only does the fluid tend to move upwardly and rearwardly within the cylinders when the inlet ports are open for any cylinder; the fluid is already moving upwardly and rearwardly in the inlet manifold 124 before the fluid is introduced into the cylinders. Since the fluid in the inlet manifold is already moving upwardly and rearwardly in the inlet chambers for the cylinders when it is projected into the cylinders by the inlet ports of the engine, it is apparent that the inlet ports will not tend to form turbulent streams of fluid having tendencies to flow in any and all directions in a cylinder when the inlet ports for the cylinder are open.

It will further be apparent from the drawing that when the blower of the engine discharges a blast of scavenging and charging fluid into the inlet manifold and through the openings 122 and 123, this blast of fluid will continue to move in all of the branches of the inlet manifold and in the inlet passages of the manifold leading to the cylinders and through the inlet ports of the cylinders and within the cylinders, as a plurality of relatively parallel streams of fluid which form the ascending and descending bodies of fluid within the cylinders and by which the cylinders are efficiently scavenged and charged.

I claim:

1. An internal combustion engine comprising a cylinder having a piston therein and a head at one end thereof, said cylinder being formed to provide a plurality of exhaust ports extending around the front of said cylinder and a plurality of inlet ports on each side of said cylinder and extending between said exhaust ports and around the rear of said cylinder, said inlet ports on opposite sides of said cylinder being formed to provide oppositely disposed side walls and inner and outer end walls, said side walls of said inlet ports on each side of said cylinder being disposed in substantially parallel planes extending obliquely to the radii of said cylinder and intersecting a radii of said cylinder at the rear of said cylinder and between the sides of said cylinder and at a plurality of points extending substantially throughout the length of said radii, said inner and outer end walls of said inlet ports being disposed in substantially parallel planes extending obliquely to said cylinder and outwardly and rearwardly toward the middle of said cylinder, a supply manifold having an inlet port in a front wall thereof and extending around the front of said cylinder between said exhaust ports and the inner end of said cylinder and having branches sloping outwardly and rearwardly toward said inlet ports on each side of said cylinder and extending beyond the rear of said cylinder and terminating at the rear of said cylinder on each side of and adjacent the middle of said cylinder, said manifold and said branches and said inlet ports being relatively uniformly curved adjacent said cylinder to smoothly direct the flow of columns of fluid into and outwardly toward the rear of said cylinder and merging in the axial plane of said radius of said cylinder and flowing outwardly toward the end of said cylinder, and means for impelling scavenging and charging fluid through said manifold inlet port and said manifold and said branches and said cylinder inlet ports to form said merging columns.

2. An internal combustion engine as defined by claim 1 and in which certain of said exhaust ports on each side of said cylinder are formed to provide oppositely disposed side walls disposed in substantially parallel planes extending obliquely to the radii of said cylinder and intersecting said radii of said cylinder at the rear of said cylinder and between the sides of said cylinder and at a plurality of points extending along the length of said radii.

3. An internal combustion engine as defined by claim 1 and in which said engine comprises a row of said cylinders with said manifold being formed to extend along the front of said cylinders and below said exhaust ports and having said branches extend between and around said cylinders to said inlet ports.

4. An internal combustion engine comprising a plurality of cylinders having head ends and crank ends and having a piston in each of said cylinders, an inlet manifold extending across the front of said cylinders adjacent the crank ends of said cylinders, said cylinders being formed to provide a plurality of exhaust passages adapted to communicate with said cylinders adjacent the front of said cylinders and between said inlet manifold and the head ends of said cylinders, said inlet manifold being formed to provide a plurality of branch passages extending between said cylinders and upwardly around said cylinders and toward the head ends of said cylinders and terminating in spaced relation to one another adjacent the back of said cylinders, said cylinders being formed to provide a plurality of inlet passages formed in groups of passages disposed on opposite sides of each of said cylinders, said groups of passages on adjacent sides of adjacent cylinders being adapted to communicate with one of said branches of said inlet manifold, said branches being formed to provide partitions adjacent the upper extremities thereof, said partitions being adapted to extend between said groups of inlet ports in said adjacent cylinders and to terminate below said inlet ports in said branch passages.

5. An internal combustion engine comprising a plurality of aligned cylinders having an inlet manifold extending from one to the other of said cylinders on one side of said cylinders, said manifold having branches formed therein with certain of said branches extending between adjacent pairs of said aligned cylinders, inlet ports for said cylinders formed in oppositely disposed relation in the sides of each of said pairs of cylinders with the inlet ports on the same side of each pair of cylinders communicating with one of said branches, and a partition formed adjacent the ends of said branches and extending across the inside of said ends and separating said inlet ports of said pairs of cylinders.

6. An internal combustion engine comprising an engine block having a row of closely spaced cylinders formed therein, cylinder sleeves in said cylinders and having rows of inlet ports formed around the opposite side and rear walls thereof for supplying charging and scavenging fluid for operating said engine, said cylinder sleeves and said cylinders also being formed around the front walls thereof and between said inlet ports to provide exhaust ports for exhausting and scavenging said engine, manifold means extending along the front walls of said cylinders and below said exhaust ports and formed in part by the front and side walls of said cylinders and including branches extending upwardly and between said cylinders for supplying scavenging and charging fluid to said inlet ports for operating said engine, said cylinders between and below said inlet ports and within said branches being formed to provide openings in said side walls of said cylinders enlarging said branches where said branches extend upwardly between said cylinder sleeves to said inlet ports, said cylinders in said row being so closely spaced as to materially restrict the flow of said scavenging and charging fluid to said inlet ports without said openings, said branches being so enlarged by said openings as to materially increase the width thereof between said cylinder sleeves to provide the passages for supplying said scavenging and charging fluid required for the operation of said engine.

7. An internal combustion engine as defined by claim 6 and in which partitions are provided in said branches and across the upper parts of said branches and extending between said inlet ports and downwardly within said branches in planes disposed transversely to said row of cylinders and terminating at the lower edges thereof above the lower extremities of said openings but below the lower extremities of said inlet ports for reinforcing said cylinders and for separating said inlet ports of adjacent cylinders.

8. An internal combustion engine comprising a manifold having spaced and inclined upper and lower walls, and a plurality of aligned cylinders projecting through the upper part of said manifold and forming branch passages in said manifold between adjacent pairs and at the ends of said cylinders, said upper wall of said manifold having an outwardly disposed front portion intersecting said cylinders adjacent the front edge of said cylinders, said front portion being positioned substantially in parallel relation to the axes of said cylinders, said cylinders also being formed to provide a plurality of inlet ports extending from said front portion to said bottom wall and disposed in horizontal alignment across said cylinders.

9. An internal combustion engine comprising a manifold having spaced and inclined upper and lower walls, said upper wall having an angularly disposed front portion forming an enlarged horizontally extending distribution chamber within the upper part of said manifold, a plurality of aligned cylinders projecting vertically across said manifold and dividing said upper part thereof into a plurality of branch passages having certain opposite end walls thereof formed by the intersecting walls of said cylinders, and a plurality of inlet ports formed in the walls of said cylinders and communicating with said branch passages in said manifold.

10. An internal combustion engine comprising an inlet manifold having an inlet opening formed therein for communication with a blower for supplying scavenging and charging fluid to said manifold, said manifold having a horizontally disposed distribution passage formed therein and extending in opposite directions from said inlet opening, said manifold also having laterally disposed branch passages formed therein and extending in spaced relation to one another from said distribution passage, said distribution and said branch passages being formed to project upwardly and laterally from said inlet opening and between upper and lower inclined walls of said manifold, and a plurality of cylinders projecting through said manifold and between said branch passages and forming the rear wall of said distribution passage and the interior walls between said branch passages.

11. An internal combustion engine comprising an engine block having a front wall, a plurality of cylinders formed in said block in spaced and substantially parallel relation to said front wall, a pair of spaced and upwardly inclined walls formed in said block and intersecting said front wall adjacent the lower edge thereof, said inclined walls being intersected by said cylinders projecting through said walls adjacent the upper extremities thereof and dividing the space between said walls into a plurality of branch passages and forming a distribution passage between said cylinders and said front wall, a plurality of inlet ports formed in said cylinders and communicating with said branch passages, and a blower secured to said front wall and having an outlet therefrom communicating with said distribution passage through an opening in said front wall, said blower being operable for supplying scavenging and charging fluid through said distribution and said branch passages to said inlet ports in said cylinders.

12. An internal combustion engine comprising an engine block having a front wall and a pair of end walls, a pair of spaced and inclined walls extending from one end wall to another of said block and intersecting said front wall adjacent the lower extremity thereof, a plurality of cylinders formed in said block and projecting across the space between said inclined walls, said cylinders and said front and end walls dividing the space between said inclined walls into an elongated distribution chamber and a plurality of branch passages, a blower supported by said front wall and communicating with said distribution chamber, and a plurality of inlet ports formed on opposite sides of said cylinders and communicating with said branch passages.

13. An internal combustion engine comprising an engine block having a plurality of aligned cylinders formed therein, said cylinders being formed to provide a plurality of transversely aligned openings therein, and a pair of parallel walls formed in said block, said walls extending from one end to the other of said block and being intersected by said cylinders, said walls, said cylinders, and said block providing a distribution passage and a plurality of branch passages in said block, said walls being formed to provide vertically disposed partitions between said aligned openings in said cylinders.

14. An internal combustion engine comprising an engine block having a plurality of aligned cylinders formed therein, a plurality of manifold distribution passages formed in said block around the lower extremities of said cylinders and projecting upwardly on opposite sides of said cylinders for supplying said cylinders, and a blower secured to said block for supplying said distribution passages with scavenging and charging fluid for said cylinders.

15. An internal combustion engine comprising an engine block having a pair of spaced and parallel cylinders formed therein, an upwardly inclined fluid supply passage formed in said block and communicating with the space between said cylinders, said passage being formed to provide an enlarged upper end between said cylinders, said enlarged upper end of said passage being formed to provide a top wall extending between said cylinders, and a partition in said passage extending downwardly from said top wall and dividing the space between said cylinders into a pair of inlet passages for said cylinders, said cylinders being formed to provide inlet ports through the walls thereof, said inlet ports being adapted to communicate with said inlet passages in regions adjacent the upper extremities of said inlet passages and with the lower edge of said partition extending into said supply passage below said inlet ports.

16. An internal combustion engine comprising a block having a pair of spaced and parallel cylinders formed therein, a charging fluid supply passage formed in said block and between said cylinders and extending upwardly in said block toward the head end of said cylinders, said fluid supply passage having an upper end wall projecting across the space between said cylinders, a partition extending downwardly from said upper end wall and between said cylinders and dividing the space between said cylinders into a fluid inlet passage for each of said cylinders, said cylinders being provided with cut-out portions on opposite sides of said partition for enlarging said inlet passages for said cylinders and said fluid supply passage to said inlet passages.

17. An internal combustion engine comprising an engine block having a pair of spaced and parallel cylinders formed therein, a wall extending transversely between said cylinders, and providing an upwardly projecting fluid supply passage between said cylinders, said wall being formed to provide a downwardly projecting partition in the upper extremity of said supply passage for dividing said supply passages into a pair of oppositely disposed inlet passages adjacent said cylinders, said wall also being formed to extend around said cylinders and to treminate adjacent the rear middle portion of said cylinders, said inlet passages formed by said wall and said partition being shaped to provide oppositely disposed crescent-shape cavities surrounding said cylinders and communicating with said supply passage below said partition.

18. An internal combustion engine comprising a block having a cylinder formed therein, an arcuate fluid supply passage formed in said block and partly surrounding said cylinder, said fluid supply passage being disposed between parallel and inclined planes relative to said cylinder and with the middle portion of said passage being disposed adjacent the lower extremity of said cylinder and with the upper ends thereof terminating in spaced relation to one another adjacent the opposite side of said cylinder, the upper ends of said passage being enlarged to extend toward the front of said cylinder, said cylinder having inlet ports formed therein on opposite walls thereof for communicating with said upper ends of said fluid supply passage.

19. An internal combustion engine comprising an engine block having an upper wall, a pair of oppositely disposed side walls, and a plurality of aligned cylinders formed therein, said block also having crankshaft bearings formed transversely thereof and between said cylinders and beyond the lower extremities of said cylinders, a plurality of cavities formed in adjacent walls of said cylinders for increasing the available space between said cylinders, a plurality of reinforcing columns formed in said block between said bearings and said top wall of said block and between said cylinders, said block being formed to provide reinforcing webs between said columns and said cylinders for reinforcing said cylinders adjacent said cavities, and means formed in said block and communicating with said cavities for supplying scavenging and charging fluid to said cylinders.

20. An internal combustion engine comprising an engine block having a plurality of aligned cylinders formed therein, aligned exhaust passages formed in said block and communicating with exhaust ports formed in said cylinders, an exhaust manifold secured to said block for receiving the exhaust fluid from said cylinders supplied by said passages, said block having an inlet manifold formed therein below said exhaust passages and disposed in spaced relation to said exhaust passages, a blower for supplying scavenging and charging fluid to said inlet manifold, said inlet manifold being provided with upwardly directed branch passages formed in said block and between said cylinders and communicating at the upper extremities thereof with inlet ports formed in the side walls of said cylinders.

21. An engine block comprising a one piece metallic body having integral side walls, front and rear end walls, a top wall, and a plurality of aligned cylinders formed therein in spaced relation to said side and end walls and to one another, said block being formed to provide a crankcase partly within the lower portion thereof and below said cylinders, an inlet manifold integrally formed in said block on one side of said block and having branches extending laterally and upwardly therefrom and between said cylinders and at the ends of said cylinders and providing throughout the extent of said manifold and said branches a portion of an upper wall for said crankcase, and a plurality of exhaust passages integrally formed in said block and above said manifold and leading from said cylinders to the exterior of said block, said exhaust passages and said manifold being adapted to extend throughout the length of said block and between said cylinders and one wall of said block.

22. An engine block comprising a one piece metallic body having integral side walls, front and rear end walls, a top wall, and a plurality of aligned cylinders formed therein in spaced relation to said side and end walls and to one another, said block being formed to provide a crankcase partly within the lower portion thereof and below said cylinders, an inlet manifold integrally formed in said block on one side of said block and having branches extending between said cylinders and at the ends of said cylinders and providing throughout the extent of said manifold and said branches and upwardly inclined wall forming a part of the upper wall for said crankcase.

23. An engine block comprising a one piece metallic body having integral side walls, front and rear end walls, a top wall, and a plurality of aligned cylinders formed therein in spaced relation to said side and end walls and to one another, said block being formed to provide a crankcase partly within the lower portion thereof and below said cylinders, and inlet manifold integrally formed in said block and having branches extending between said cylinders and at the ends of said cylinders and providing throughout the extent of said manifold and said branches an upwardly inclined manifold passage leading to the spaces between said cylinders and to the spaces between the end cylinders and the ends of said block, said block being formed to provide inlet chambers for each side of each of said cylinders, said inlet chambers being formed in said block by walls extending across the upper extremities of said branches and in spaced relation to said cylinders.

24. An engine block comprising an integrated metallic body having side walls, front and rear end walls, a top wall, and a plurality of aligned cylinders formed therein in spaced relation to said side and end walls and to one another, said block being formed to provide a crankcase partly within the lower portion thereof and below said cylinders, an inlet manifold formed in said block and having branches extending between said cylinders and at the ends of said cylinders and providing throughout the extent of said manifold and said branches an upwardly inclined manifold passage leading to opposite sides of each of said cylinders, said cylinders having formed therein oppositely disposed and aligned openings communicating with the upper extremities of said branches and enlarging the extent of said branches between said cylinders, said block being formed to provide integral column means for re-enforcing said block and said cylinders across said openings.

25. An engine block comprising an integrated metallic body having side walls, front and rear end walls, a top wall, and a plurality of aligned cylinders formed therein in spaced relation to said side and end walls and to one another, said block being formed to provide a crankcase partly within the lower portion thereof and below said cylinders, an inlet manifold formed in said block and having branches extending between said cylinders and at the ends of said cylinders and providing throughout the extent of said manifold and said branches an upwardly inclined manifold passage leading to the opposite sides of each of said cylinders, a plurality of exhaust passages formed in said block and above said manifold and leading from said cylinders to the exterior of said block, said manifold branches between said cylinders being formed to provide relatively vertically disposed inlet passages leading to said cylinders and arcuately extending around said cylinders from said exhaust manifold passages to the rear portions of said cylinders and terminating beyond said rear portions of said cylinders.

26. An engine block comprising an integrated metallic body having side walls, front and rear end walls, a top wall, and a plurality of aligned cylinders formed therein in spaced relation to said side and end walls and to one another, said block being formed to provide a crankcase partly within the lower portion thereof and below said cylinders, an inlet manifold formed in said block and having branches extending between said cylinders and at the ends of said cylinders, said cylinders being adapted to communicate with the upper extremities of said branches, said block also being formed to provide a plurality of crankshaft bearings extending transversely of said block and between said cylinders and within said crankcase, and a plurality of integral columns formed in said block and between said cylinders and extending from the top wall of said block to the opposite ends of said bearings and intersecting said manifold.

References Cited in the file of this patent

UNITED STATES PATENTS

| | | |
|---|---|---|
| 1,422,338 | Church | July 11, 1922 |
| 1,531,397 | Ringwald et al. | Mar. 21, 1925 |
| 1,629,664 | Jack | May 24, 1927 |
| 1,673,280 | Evans | June 12, 1928 |
| 1,822,857 | McCuen | Sept. 8, 1931 |
| 1,968,110 | Walker | July 31, 1934 |
| 1,975,990 | Timian | Oct. 9, 1934 |
| 2,010,296 | Egan | Aug. 6, 1935 |
| 2,057,062 | Schneider | Oct. 13, 1936 |
| 2,058,528 | Thege et al. | Oct. 27, 1936 |
| 2,075,232 | Schneider | Mar. 30, 1937 |
| 2,115,180 | Schneider | Apr. 26, 1938 |
| 2,136,960 | Wurtele | Nov. 15, 1938 |
| 2,218,202 | Lieberherr | Oct. 15, 1940 |
| 2,228,832 | Lieberherr | Jan. 14, 1941 |

(Other references on following page)

UNITED STATES PATENTS

| | | |
|---|---|---|
| 2,304,694 | Kammer | Dec. 8, 1942 |
| 2,346,463 | Szekely | Apr. 11, 1944 |
| 2,393,342 | Schneider | Jan. 22, 1946 |
| 2,477,712 | Anderson | Aug. 2, 1949 |
| 2,660,156 | Kopf | Apr. 5, 1953 |

FOREIGN PATENTS

| | | |
|---|---|---|
| 451,377 | Germany | Oct. 26, 1927 |
| 618,058 | Germany | Aug. 31, 1935 |
| 665,126 | Germany | Sept. 17, 1938 |
| 846,204 | France | May 27, 1939 |
| 875,899 | France | July 7, 1942 |
| 720,908 | Germany | May 19, 1942 |
| 722,126 | Germany | July 1, 1942 |